July 2, 1968  F. J. COLVILLE  3,390,586
APPARATUS FOR ACTUATING A CONTROL MEMBER
CARRIER ON A ROTATABLE MEMBER
Filed May 3, 1966  2 Sheets-Sheet 1
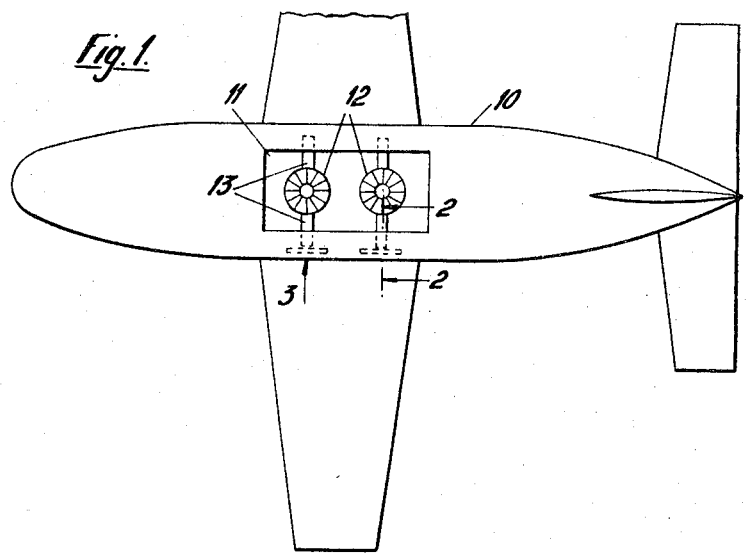
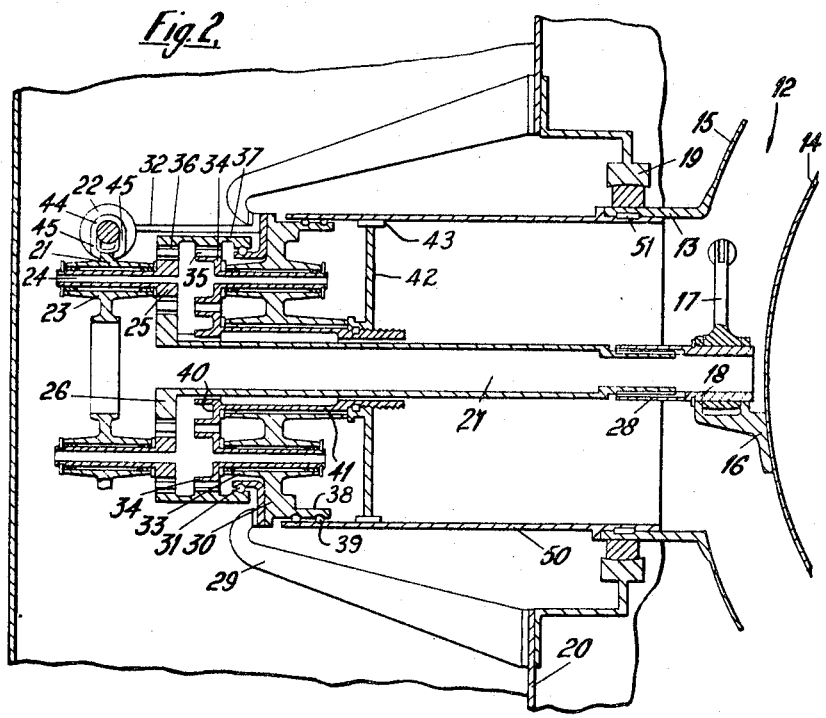
Inventor
Francis Jeffrey Colville
By
Cushman, Darby & Cushman
Attorneys

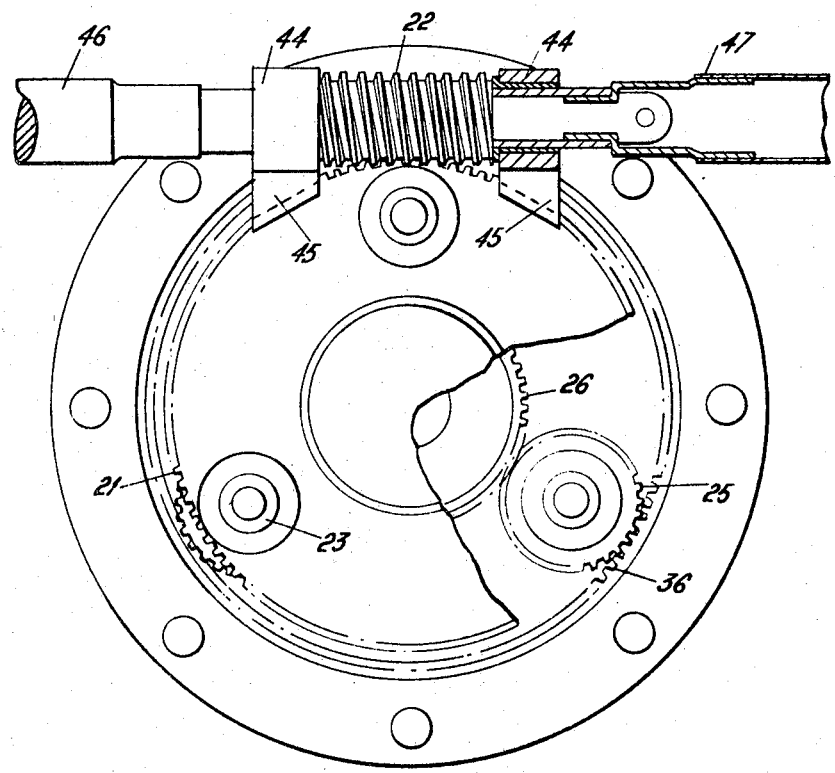

United States Patent Office 3,390,586
Patented July 2, 1968

3,390,586
APPARATUS FOR ACTUATING A CONTROL MEMBER CARRIER ON A ROTATABLE MEMBER
Francis J. Colville, Sutton-in-Ashfield, England, assignor to Rolls-Royce Limited, Derby, England, a British company
Filed May 3, 1966, Ser. No. 547,291
Claims priority, application Great Britain, May 15, 1965, 20,612/65
10 Claims. (Cl. 74—469)

ABSTRACT OF THE DISCLOSURE

An apparatus for actuating a control member, such as a fuel control unit, the control member being carried on a rotatable member such as a pivotal gas turbine engine. The apparatus includes a first input means and a second input means and suitable gear trains to provide a first function wherein rotation of the rotatable member does not effect actuation of the control member and a second function whereby an input to change the control member has a proportional affect on the control member and hence by adding such situations together it will be seen that the algebraic sum of the two inputs is such that rotation or movement of the control member relative to the rotatable member is a function of the first input member only.

This invention relates to apparatus for actuating a control member carried on a rotatable member.

According to this invention apparatus for actuating a control member carried on a rotatable member comprises a rotatable member having a rotatable control device attached thereto, fixed structure having an input rotatable member supported therefrom, the axes of rotation of the rotatable member, the control device and the input member being common and there being gearing between the input member and the control device adapted to transmit motion between the input member and the control device while precluding any motion of the control device due to motion of the rotatable member.

Preferably said input member comprises an input gear wheel carrying at least one input planet wheel, each input planet wheel meshing with teeth on the outer periphery of a first sun wheel carried from said rotatable control device and with internal teeth of a free annulus gear, the free annulus gear having internal teeth which mesh with a second set of planet gears which are carried from the fixed structure and which mesh with external teeth on a second sun wheel rotating with the rotatable member.

All said planet gears may be of the same radius, both sun wheels may be of the same radius and both sets of internal teeth on the free annulus may lie on the same radius.

Said rotatable member may comprise a gas turbine engine rotatable about trunnions and said control device comprises a linkage adapted to control the fuel control unit of the gas turbine engine.

The invention will now be described with reference to the accompanying drawings in which:

FIGURE 1 is a plan view of an aircraft whose pivotable engines comprise rotatable members having apparatus according to the invention, FIGURE 2 is an enlarged section on the line 2—2 of FIGURE 1; and FIGURE 3 is an enlarged partly broken away view on the arrow 3 of FIGURE 1.

FIGURE 1 shows an aircraft 10 having a bay 11 in its fuselage in which engines 12 are pivotally mounted on trunnion 13. The engines 12 may be pivoted by an actuator (not shown) from a vertical position as shown to a position in which they produce a component of thrust in the forward or rearward direction.

Referring to FIGURE 2, each engine 12 has a bleed manifold formed between an inner casing 14 and an outer casing 15, and from the inner casing 14 is carried a bracket 16 which holds a pivotable lever 17 where may be pivoted by a stub shaft 18. From the end of the lever 17 there extends a linkage (not shown) which transmits movement of the lever to a fuel control unit (not shown) fixed to the engine. Thus the lever 17 comprises a rotatable control device.

The trunnion 13 is carried in a bearing 19 from the wall 20 of the bay 11. A tubular projection 50 slides inside the trunnion 13 and is prevented from rotating inside the trunnion by keys 51. It will be appreciated that any rotation of the engine about the axis of the trunnions 13 will effect rotation of the stub shaft 18 relative to the engine if the shaft 18 is fixed relative to the structure of the aircraft; this means that any mechanism for actuating the shaft 18, and hence the fuel control unit on the engines 12, from the aircraft structure must correct for pivoting movement of the engines.

In the present instance the movement for controlling the fuel control units is applied to an input gear wheel 21 by a worm wheel 22 as further described below in relation to FIGURE 3. The input gear wheel 21 has three bearings 23 in which are carried shafts 24 of input planet wheels 25.

The three input planet wheels 25 mesh with the teeth of a sun wheel 26 carried at the end of a shaft 27, the other end having a splined connection 28 to the stub shaft 18.

The fixed structure 20 carries arms 29 which extend toward the extremity of the projection 50. The arms 29 support a carrier 30, a bearing 31 and a projection 32 which carries the worm wheel 22. The carrier 30 has three equi-angularly spaced bearings 33 each of which carries one of a second set of planet gears 34. The planet gears 34 together with the planet gears 25 mesh with internal sets of teeth 35 and 36 respectively of a free annulus gear 37 carried on the bearing 31 and free to rotate with respect to the carrier 30.

The carrier 30 has a central aperture through which passes the shaft 27 and also has an axially extending cylindrical flange 38 which projects inside the end of the projection 50 and which seals by means of O rings 39 with the internal surface of the projection 50 so as to substantially seal off the end of the projection 50 and hence the trunnion 13.

The second set of planet wheels 34 engage with an external set of teeth on a second sun wheel 40. The wheel 40 is carried on a hollow shaft 41 coaxial with and lying outside the shaft 27, the shaft 41 also passing through the central aperture in the carrier 30. The shaft 41 is drivingly connected to a flange 42 which extends to the inner surface of the projection 50 and is drivingly connected thereto by keys 43.

As can best be seen from FIGURE 3, the worm wheel 22 is carried in bearings 44 on the projection 32. From the part of the housing of the bearings 44 facing the input gear wheel 21 there extend pairs of abutments 45 between which the rim of the wheel 21 is trapped to preclude axial movement thereof. By thus trapping the wheel 21 adjacent the engagement between the worm wheel 22 and the gear wheel 21, distortion of the wheel 21 is kept to a minimum since the only axial stresses on the wheel 21 occur at the engagement. The worm wheel 22 is driven by a rod 46, which is connected to a pilot's control (not shown). A further rod 47 carries the drive to any further engine in the aircraft.

The radii of the two sets of planet wheels 25 and 34 are the same, as are the radii of the sun wheels 26 and 40 and the radii of the sets of teeth 35 and 36. It will be noted that the splined engagement 28 enables the shaft 27 to be withdrawn from the shaft 18 while the projection 50 may be slid from the trunnion 13.

Thus by disengaging the projections 29 from the structure 20 the entire gearing may be moved from the trunnion 13 for engine removal.

In order that the operation of the gearing system may be understood, the operation of the gearing will first be considered when the worm wheel 22, and hence the input gear wheel 21, is stationary while the engine 12 undergoes rotation about the axis of the trunnions 13.

In these circumstances, relative angular motion between the second set of planet wheels 34 whose axes are fixed and the sun wheel 40, which is drivingly connected to the projection 50 and hence the trunnion 13, will occur equal to the angular motion of the engine. The planet wheels 34 will therefore turn about their axes and cause the free annulus gear 37 to turn in an opposite direction to the motion of the sun wheel 40.

The rotation of the free annulus 37 thus causes rotation of the planet gears 25 whose axes are fixed by virtue of there being no motion of the input wheel 21. This motion of the planet gears 25 causes rotation of the first sun wheel 26 in the opposite direction to the rotation of the free annulus 37 and hence in the same direction as the rotation of the engine 12. As the radii of the various corresponding gears are the same as set out above, the rotation of the sun wheel 26 will be of the same magnitude as that of the engine 12, and therefore the shaft 27 and hence the lever 17 will maintain its angular position relative to the engine 12 and the fuel control unit setting will not be altered.

If we now consider rotation of the worm wheel 26 while the engine 12 is maintained stationary with respect to the axis of the trunnions 13, the form wheel 22 will rotate the input gear wheel 21 and hence rotate the axes of the input planet gears 25. The trunnion 13 is stationary, hence the sun wheel 40 is stationary, and since the carrier 30 is stationary the planet wheels 34 are fixed stationary. The annulus gear 37 is therefore precluded from motion.

The axes of the planet gears 25 are moved by the gear 21 and the fixed annulus 37 acts as a reaction member; the planet gears 25 therefore drive the sun gear 26 in the same direction as the motion of the input gear 21 with a magnification of angular motion. Therefore the lever 17 is driven through the shafts 27 and 18 and control of the fuel control unit is effected.

Thus it will be seen that (a) rotation of the engine alone does not affect the setting of the lever 17, (b) rotation of the worm wheel 22 will have a proportional effect on the setting of the lever 17 and hence by adding such situations together it will be seen that any combination of engine rotation and worm rotation will only cause the lever 17 to be moved by a rotation proportional to that of the worm wheel.

The worm wheel 22 and gear wheel 21 could be replaced by a simple rod and lever, the lever being fixed to the carrier of the input planet gears 25, this carrier not then being a gear wheel.

Although the invention has been described in its application to the controlling of a fuel control unit on a pivotable gas turbine engine it will be understood that the apparatus of the invention could be used to control rotatable control devices on various rotatable members, for instance the rotating parts of electric motors or of gas turbine engines. The rotation of the rotatable members need not be through a very considerable angle.

I claim:

1. Apparatus for actuating a control member carried on a rotatable member comprising: a first rotatable input member; an epicyclic gear train drivingly connected to said first rotational input member; a second rotational input member drivingly connected to said epicyclic gear train and to said rotatable member whereby an input proportional to the rotation of the rotatable member may be introduced into the epicyclic gear train; and an output member drivingly connected to said gear train and to said control member so as to actuate said control member from said epicyclic train, said epicyclic gear train being adapted to provide at said output member a drive to said control member which is the algebraic sum of the rotation of said first and second input members whereby rotation of the control member relative to the rotatable member is a function of said first input member only.

2. Apparatus for actuating a control member carried on a rotatable member as claimed in claim 1 in which said first input member comprises a first gear carrier, said epicyclic gear train comprises a plurality of first planet wheels carried from said first gear carrier so as to be rotatable about their own axes; an annulus gear, a second eipcyclic gear train drivingly connected to said second input member and to said annulus gear; and a first sun wheel carried from said rotatable control member so as to rotate with it and meshing with said first planet wheels, whereby the annulus gear and the first gear carrier drive said first planet wheels so as to impress upon said first sun wheel a rotation which is the algebraic sum of the rotations of said first and second input members.

3. An apparatus as claimed in claim 2 in which said second epicyclic gear train comprises a second sun wheel, a second gear carrier and a second set of planet wheels carried from said second gear carrier so as to be rotatable about their own axes, said second sun wheel being drivingly connected to said second input member and meshing with said second planet wheels, and said second planet wheels further meshing with said annulus gear.

4. Apparatus for actuating a control member carried on a rotatable member as claimed in claim 3 and in which all said planet gears are of the same radius, both sun wheels are of the same radius, and both sets of planet gears mesh with internal teeth on the free annulus gear at the same radius.

5. Apparatus for actuating a control member carried on a rotatable member as claimed in claim 4 and in which said first input gear carrier comprises an input gear wheel and in which there is a worm wheel adapted to drive the input gear wheel.

6. Apparatus for actuating a control member carried on a rotatable member as claimed in claim 5 including fixed structure having a projection carrying said second sun wheel, there being a pair of abutments on said projection adjacent to where said worm wheel and first input gear carrier mesh and between which the input gear wheel is held against axial movement.

7. Apparatus for actuating a control member carried on a rotatable member as claimed in claim 2 and in which there is a tubular projection from the rotatable member carried with the axis of rotation of the rotatable member and having an open end distant from the rotatable member, fixed structure, a planet carrier attached to the fixed structure carrying said second set of planet gears and blocking off said open end of the tubular projection.

8. Apparatus for actuating a control member carried on a rotatable member as claimed in claim 7 and in which there is a first shaft which is carried within said tubular projection and which engages at its extremity nearest the rotatable member with said control member, the first shaft extending through said planet carrier and carrying the first sun wheel at its other extremity.

9. Apparatus for actuating a control member carried on a rotatable member as claimed in claim 8 and in which there is a second shaft coaxial with and surrounding said first shaft, interconnecting means whereby said second shaft and said tubular projection are drivingly interconnected, said second shaft projecting through said carrier and carrying said second sun wheel so that said second sun wheel lies between said first sun wheel and said carrier.

10. Apparatus for actuating a control member carried on a rotatable member as claimed in claim 9 and in which there is a sliding connection in said first shaft and a disengageable connection in said tubular projection whereby said shaft and said tubular projection may be disengaged from said rotatable member and control member, hence disengaging said input member and said gearing from said rotatable member and control member.

References Cited

UNITED STATES PATENTS

| | | | |
|---|---|---|---|
| 2,542,157 | 2/1951 | Odom | 74—710 |
| 3,094,967 | 6/1963 | Willis | 74—710 XR |
| 2,691,308 | 10/1954 | Lincoln et al. | 74—388 |

FRED C. MATTERN, JR., *Primary Examiner.*

B. T. CALLAHAN, *Assistant Examiner.*